United States Patent
Lin et al.

(10) Patent No.: US 11,160,105 B2
(45) Date of Patent: Oct. 26, 2021

(54) SCHEDULING REQUEST TRANSMISSION CONTROL METHOD AND RELATED PRODUCT

(71) Applicant: GUANGDONG OPPO MOBILE TELECOMMUNICATIONS CORP., LTD., Guangdong (CN)

(72) Inventors: Yanan Lin, Dongguan (CN); Zhi Zhang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/673,909

(22) Filed: Nov. 4, 2019

(65) Prior Publication Data
US 2020/0137787 A1 Apr. 30, 2020

Related U.S. Application Data

(63) Continuation of application No. PCT/CN2017/083105, filed on May 4, 2017.

(51) Int. Cl.
*H04W 72/12* (2009.01)
*H04L 5/00* (2006.01)
(Continued)

(52) U.S. Cl.
CPC ....... *H04W 72/1289* (2013.01); *H04L 5/0082* (2013.01); *H04W 72/048* (2013.01);
(Continued)

(58) Field of Classification Search
CPC ............ H04W 72/1289; H04W 80/02; H04W 72/0413; H04W 72/048; H04W 80/08; H04L 5/0082
See application file for complete search history.

(56) References Cited

U.S. PATENT DOCUMENTS 8,059,524 B2   11/2011   Bertrand
8,379,507 B2   2/2013    Bertrand
(Continued)

FOREIGN PATENT DOCUMENTS

CN   101795497 A   8/2010
CN   101980575 A   2/2011
(Continued)

OTHER PUBLICATIONS

International Search Report in the international application No. PCT/CN2017/083105, dated Jan. 15, 2018.
(Continued)

*Primary Examiner* — Edan Orgad
*Assistant Examiner* — Malick A Sohrab
(74) *Attorney, Agent, or Firm* — Perkins Coie LLP

(57) ABSTRACT

Disclosed are a scheduling request transmission control method and a related product. In the method, a terminal acquires reference information about a first parameter needing to be indicated to a network side device, wherein the first parameter is a parameter associated with cached data to be transmitted of the terminal. The terminal queries a pre-set mapping relationship between information about the first parameter and information about a second parameter of a physical uplink control channel (PUCCH) resource, and acquires reference information, corresponding to the reference information about the first parameter, about the second parameter of the PUCCH resource, wherein the second parameter is a parameter associated with the PUCCH resource for transmitting a scheduling request (SR). The terminal transmits the SR for scheduling the cached data on the PUCCH resource determined by means of the reference information about the second parameter.

17 Claims, 10 Drawing Sheets

(51) Int. Cl.
*H04W 72/04* (2009.01)
*H04W 80/02* (2009.01)
*H04W 80/08* (2009.01)

(52) U.S. Cl.
CPC ....... *H04W 72/0413* (2013.01); *H04W 80/02* (2013.01); *H04W 80/08* (2013.01)

(56) References Cited

U.S. PATENT DOCUMENTS

| | | | |
|---|---|---|---|
| 8,665,724 B2 | 3/2014 | Stanwood et al. | |
| 8,750,225 B2 | 6/2014 | Dong | |
| 8,797,968 B2 | 8/2014 | Bertrand et al. | |
| 8,995,313 B2 | 5/2015 | Yang | |
| 9,125,193 B2 | 9/2015 | Yang et al. | |
| 9,420,569 B2 | 8/2016 | Yang | |
| 9,474,055 B2 | 10/2016 | Bertrand et al. | |
| 9,674,823 B2 | 6/2017 | Yang et al. | |
| 2009/0175159 A1* | 7/2009 | Bertrand | H04L 5/0053 370/203 |
| 2012/0014243 A1 | 1/2012 | Bertrand | |
| 2012/0093106 A1 | 4/2012 | Dong | |
| 2013/0028221 A1 | 1/2013 | Seo | |
| 2013/0094410 A1 | 4/2013 | Yang | |
| 2013/0100866 A1 | 4/2013 | Yang | |
| 2013/0155988 A1 | 6/2013 | Bertrand et al. | |
| 2013/0163487 A1 | 6/2013 | Yang et al. | |
| 2013/0163532 A1 | 6/2013 | Anderson et al. | |
| 2014/0050185 A1 | 2/2014 | Hooli | |
| 2014/0341172 A1 | 11/2014 | Bertrand et al. | |
| 2015/0078225 A1 | 3/2015 | Yang et al. | |
| 2016/0233989 A1* | 8/2016 | Belghoul | H04L 5/0092 |
| 2016/0242193 A1* | 8/2016 | Hong | H04W 76/10 |
| 2017/0048847 A1 | 2/2017 | Bertrand et al. | |
| 2017/0202009 A1 | 7/2017 | Kim | |
| 2017/0245266 A1 | 8/2017 | Yang et al. | |
| 2017/0311254 A1* | 10/2017 | Ly | H04W 48/14 |
| 2018/0077719 A1* | 3/2018 | Nory | H04W 28/0278 |
| 2018/0302900 A1* | 10/2018 | Ibars Casas | H04W 72/042 |
| 2019/0104538 A1 | 4/2019 | Kim et al. | |
| 2019/0380153 A1* | 12/2019 | Damnjanovic | H04W 72/14 |
| 2020/0296754 A1* | 9/2020 | Kim | H04W 72/0413 |

FOREIGN PATENT DOCUMENTS

| | | | | |
|---|---|---|---|---|
| CN | 102281133 B | 2/2014 | | |
| CN | 105721118 A | 6/2016 | | |
| CN | 105991209 A | 10/2016 | | |
| CN | 106550457 A | 3/2017 | | |
| EP | 2675081 A1 * | 12/2013 | ........ | H04W 72/1278 |
| EP | 2675081 A1 | 12/2013 | | |
| KR | 20100065282 A | 6/2010 | | |
| KR | 20140040798 A | 4/2014 | | |
| RU | 2557164 C2 | 7/2015 | | |
| WO | 2015137208 A1 | 9/2015 | | |
| WO | 2016010227 A1 | 1/2016 | | |
| WO | 2016157797 A1 | 10/2016 | | |
| WO | 2016182260 A1 | 11/2016 | | |
| WO | 2018201411 A1 | 11/2018 | | |

OTHER PUBLICATIONS

Written Opinion of the International Search Authority in the international application No. PCT/CN2017/083105, dated Jan. 15, 2018.
Intel Corporation, "Enhancements of SR/BSR in NR", 3GPP TSG RAN WG2 Meeting #97, R2-1701723, Feb. 13-17, 2017.
LG Electronics Inc; "SR enhancement for New RAT", 3GPP TSG-RAN WG2 Meeting #97, R2-1701536, Feb. 13-17, 2017.
Notice of Allowance of the Russian application No. 2019138323, dated May 27, 2020.
3GPP TSG-RAN WG1 #86bis-R1-1610191—Lisbon, Portugal, Oct. 10-14, 2016 Intel Corporation, Scheduling request design for NR (6 pages).
3GPP TSG-RAN WG2 NR Ad Hoc—Spokane, Washington Jan. 1-19, 2017—R2-1700236—InterDigital Communications, LCP and Scheduling Aspects for Multiple Numerologies (3 pages).
Examination Report of European Patent Application No. 17 908 709.3 dated Nov. 11, 2020 (7 pages).
First Examination Report dated Dec. 18, 2020 of Chilean Patent Application No. 201903133 (13 pages).
First Examination Report dated Dec. 8, 2020 of Canadian Patent Application No. 3,062,957 (5 pages).
First Examination Report dated Nov. 2, 2020 of Chinese Patent Application No. 2019113020434 (11 pages).
IPI, Examination Report for Indian Patent Application No. 201917044728. dated Feb. 11, 2021. 7 pages.
IPOS, Supplementary Examination Report for Singaporean Patent Application No. 11201910210S. dated Apr. 5, 2021.
KIPO, Notification of Reason for Refusal for Korean Patent Application No. 10-2019-7033283. dated Jan. 27, 2021.
POTEVIO: "Discussion on resource configuration for UL URLLC", 3GPP Draft; R1-1700454, 3rd Generation Partnership Project (3GPP), Mobilecompetence Centre; 650, Route Des Lucioles: F-06921 Sophia-Antipolis Cedex France vol. RAN WG1, no. Spokane, USA; Jan. 16, 2017-Jan. 20, 2017 Jan. 16, 2017 (Jan. 16, 2017), XP051207987 Retrieved from the Internet: URL: http://www.3gpp. org/ftp/ Meetings 3GPP SYNC/RAN1/Docs/.
Supplementary European Search Report in the European application No. 17908709.3, dated Mar. 6, 2020.
INAPI, Office Action for Chilean Patent Application No. 201903133. dated Apr. 15, 2021.21 pages with English translation.
JPO, Notice of Reasons for Refusal for Japanese Patent Application 2019-559740. dated Apr. 29, 2021.6 pages with English translation.
EPO, Examination Report for European Patent Application No. 17908709.3. dated Jun. 4, 2021. 37 pages.
KIPO, Notice of Allowance for Korean Patent Application No. 10-2019-7033283. dated Jul. 30, 2021. 3 pages with English translation.

* cited by examiner

SCHEDULING REQUEST TRANSMISSION CONTROL METHOD AND RELATED PRODUCT

CROSS-REFERENCE TO RELATED APPLICATIONS

This is a continuation application of International Patent Application No. PCT/CN2017/083105, filed on May 4, 2017, the contents of which are hereby incorporated by reference in its entirety.

BACKGROUND

The 5th-Generation (5G) New Radio (NR) is a subject raised recently by the 3rd Generation Partnership Project (3GPP). With increasingly deep discussions about a 5G technology, on one hand, because of backward compatibility of a communication system, a new technology researched and developed later tends to be compatible with a technology which has been standardized before; and on the other hand, because of existence of numerous existing designs for 4th Generation (4G) mobile communication Long Term Evolution (LTE), flexibility of 5G may inevitably be sacrificed for compatibility to further bring reduction in performance. Therefore, researches in two directions are concurrently made by the 3GPP at present. Herein, the technical discussion group not considering backward compatibility is called 5G NR.

In an SR transmission mechanism for User Equipment (UE) in an LTE system specified in an LTE Media Access Control (MAC) protocol (TS 36.321 MAC protocol), when the UE is required to send data to be transmitted (the data to be transmitted may be data cached in a Radio Link Control (RLC) layer and/or a Packet Data Convergence Protocol (PDCP) layer), the UE may judge whether there is a Physical Uplink Control Channel (PUCCH) resource in a present Transmission Time Interval (TTI) or not. If PUCCH resources are configured and an sr-ProhibitTimer does not run (the sr-ProhibitTimer is configured by Radio Resource Control (RRC) signaling mainly to limit frequent SR transmission and occupation of excessive PUCCH resources), a Physical (PHY)-layer entity is instructed to send an SR on the corresponding PUCCH resource. Simply speaking, the SR is triggered and sent because there is cached data to be transmitted in one or a group of logical channels of the UE (for example, cached data in the RLC layer and/or the PDCP layer) and, meanwhile, the UE does not obtain an Uplink Shared Channel (UL-SCH) resource to transmit the corresponding data to be transmitted. For transmitting the SR, the UE is required to obtain an effective PUCCH resource. If the UE may obtain the effective PUCCH resource in a certain TTI, a MAC-layer entity may notify the PHY-layer entity to transmit the SR on the corresponding PUCCH resource. A corresponding parameter for the SR (for example, the PUCCH resource transmitting the SR) is configured through an RRC-layer entity, and a configuration Information Element (IE) of the RRC signaling is as follows:

```
SchedulingRequestConfig ::=
CHOICE {
release NULL,
setup SEQUENCE {
sr-PUCCH-ResourceIndex INTEGER (0..2047),
sr-ConfigIndex INTEGER (0..157),
dsr-TransMax ENUMERATED {n4, n8, n16, n32, n64, spare3, spare2,
spare1}
}
}.
```

Herein, sr-PUCCH-ResourceIndex indicates a frequency-domain resource of a PUCCH for SR transmission of the UE, sr-ConfigIndex indicates a time-domain resource of the PUCCH for SR transmission of the UE, and dsr-TransMax determines a maximum number of SR transmission times. For how the sr-ConfigIndex determines a time-domain position of the SR, according to a specification of TS 36.213, an SR transmission example is an uplink subframe meeting the following equation:

$(10 \times n_f + \lfloor n_s/2 \rfloor - N_{OFFSET,SR}) \mod SR_{PERIODICITY} = 0$ Herein, $n_f$ is a system frame number, $n_s$ is a slot number, $N_{offset,SR}$ is an offset of the SR, $I_{sr}$ is configured by the RRC-layer entity, and the specific subframe where the SR is transmitted may be determined according to $I_{sr}$. A relationship between time-domain period and subframe offset of the PUCCH resource for SR transmission of the UE is shown in Table 1.

TABLE 1

| $I_{sr}$ | $SR_{PERIODICITY}$ | $N_{offset, SR}$ |
|---|---|---|
| 0-4 | 5 | $I_{sr}$ |
| 5-14 | 10 | $I_{sr}$-5 |
| 15-34 | 20 | $I_{sr}$-15 |
| 35-74 | 40 | $I_{sr}$-35 |
| 75-154 | 80 | $I_{sr}$-75 |
| 155-156 | 2 | $I_{sr}$-155 |
| 157 | 1 | $I_{sr}$-157 |

Thus it can be seen that, in an existing LTE MAC protocol, an SR is triggered by a MAC-layer entity and the MAC-layer entity instructs a PHY-layer entity to transmit the SR on a corresponding (effective) PUCCH resource. Since the SR is only 1 bit information in a PHY layer, and namely may only indicate whether UE is required to transmit data to be transmitted or not, a network-side device further requires an additional signaling overhead to obtain configuration information such as a TTI corresponding to the data to be transmitted, which makes SR resource scheduling efficiency of an LTE system for the data to be transmitted relatively low and difficult to meet a requirement of a future communication system.

SUMMARY

The disclosure relates to the technical field of communication, and more particularly to a Scheduling Request (SR) transmission control method and a related product.

Embodiments of the disclosure provide an SR transmission control method and a related product, to improve SR transmission flexibility of a wireless communication system and improve resource scheduling efficiency of a data transmission channel in the wireless communication system.

According to a first aspect, the embodiments of the disclosure provide an SR transmission control method, which may include the following operations.

A terminal acquires reference information of a first parameter required to be indicated to a network-side device, the first parameter being a parameter associated with cached data to be transmitted of the terminal, the reference information of the first parameter being used for the network-side device to determine a licensed resource and the licensed resource being used to transmit the cached data.

The terminal queries a preset mapping relationship between information of a first parameter and information of a second parameter of a PUCCH resource to acquire reference information, corresponding to the reference information of the first parameter, of the second parameter of the PUCCH resource, the second parameter being a parameter associated with the PUCCH resource used to transmit an SR.

The terminal transmits the SR used to schedule the cached data, on the PUCCH resource determined by the reference information of the second parameter.

It can be seen that, in the embodiments of the disclosure, the terminal acquires the reference information of the first parameter required to be indicated to the network-side device at first, then queries the preset mapping relationship between the information of the first parameter and the information of the second parameter of the PUCCH resource to acquire the reference information, corresponding to the reference information of the first parameter, of the second parameter of the PUCCH resource and finally transmits the SR used to schedule the cached data, on the PUCCH resource determined by the reference information of the second parameter. Since the information of the first parameter forms the mapping relationship with the information of the second parameter, the SR may be transmitted to enable the network-side device to acquire the reference information, corresponding to the reference information of the second parameter, of the first parameter at the same time of receiving the SR and further learn configuration information of the licensed resource used to transmit the cached data, and no additional signaling overhead is required to transmit the configuration information of the licensed resource. Therefore, improvement in SR transmission flexibility of a wireless communication system and improvement in resource scheduling efficiency of a data transmission channel in the wireless communication system are facilitated.

In a possible design, before the operation that the terminal acquires the reference information of the first parameter required to be indicated to the network-side device, the method may further include the following operation.

The terminal acquires the cached data.

In a possible design, the operation that the terminal acquires the reference information of the first parameter required to be indicated to the network-side device may include the following operation.

Responsive to detecting that no UL-SCH resource is obtained to transmit the cached data, the terminal acquires the reference information of the first parameter required to be indicated to the network-side device.

It can be seen that, in the design, the terminal specifically acquires the reference information of the first parameter required to be indicated to the network-side device responsive to detecting that no UL-SCH resource is obtained to transmit the cached data in a present TTI. In such a manner, the terminal may dynamically configure reference information of an alternative resource used to transmit the cached data, i.e., the reference information of the first parameter, in real time according to a transmission resource scheduling condition of the cached data and then transmit the SR to synchronously indicate the reference information of the first parameter to the network-side device to enable the network-side device to timely acquire the reference information of the alternative resource, so that the configuration information of the licensed resource transmitting the cached data may be accurately determined, and improvement in resource scheduling flexibility and real-time performance of the wireless communication system is facilitated.

In a possible design, the cached data may include at least one of: data cached in an RLC layer of the terminal and data cached in a PDCP layer of the terminal.

In a possible design, the parameter associated with the cached data to be transmitted of the terminal may include any one of: a PHY-layer parameter numerology of the licensed resource used to transmit the cached data, a TTI duration of the licensed resource used to transmit the cached data and a data size of the cached data.

The second parameter may include at least one of: a resource type of the PUCCH resource, a resource block identifier of the PUCCH resource and a total number of repeated SR transmission times on the PUCCH resource.

In a possible design, the PUCCH resource may include at least one of: a short-duration PUCCH resource and a long-duration PUCCH resource.

According to a second aspect, the embodiments of the disclosure provide an SR transmission control method, which may include the following operations.

A network-side device receives an SR used to schedule cached data, on a PUCCH resource determined by reference information of a second parameter, the second parameter being a parameter associated with the PUCCH resource used to transmit the SR.

The network-side device queries a preset mapping relationship between information of a first parameter and information of a second parameter of a PUCCH resource to acquire reference information, corresponding to the reference information of the second parameter, of the first parameter, the first parameter being a parameter associated with the cached data to be transmitted of a terminal.

The network-side device sends a resource scheduling instruction for a licensed resource used to transmit the cached data, the resource scheduling instruction containing indication information of the licensed resource determined by the reference information of the second parameter.

It can be seen that, in the embodiments of the disclosure, the network-side device receives the SR used to schedule the cached data, on the PUCCH resource determined by the reference information of the second parameter at first, then queries the preset mapping relationship between the information of the first parameter and the information of the second parameter of the PUCCH resource to acquire the reference information, corresponding to the reference information of the second parameter, of the first parameter and finally sends the resource scheduling instruction for the licensed resource used to transmit the cached data. Since the information of the first parameter forms the mapping relationship with the information of the second parameter, the SR may be transmitted to enable the network-side device to acquire the reference information, corresponding to the reference information of the second parameter, of the first parameter at the same time of receiving the SR and further learn configuration information of the licensed resource used to transmit the cached data, and no additional signaling overhead is required to transmit the configuration information of the licensed resource. Therefore, improvement in SR transmission flexibility of a wireless communication system and improvement in resource scheduling efficiency of a data transmission channel in the wireless communication system are facilitated.

In a possible design, after the operation that the network-side device sends the resource scheduling instruction for the licensed resource used to transmit the cached data, the method may further include the following operation.

The network-side device receives the cached data on the licensed resource determined by the reference information of the second parameter.

In a possible design, the cached data may include at least one of: data cached in an RLC layer of the terminal and data cached in a PDCP layer of the terminal.

In a possible design, the parameter associated with the cached data to be transmitted of the terminal may include any one of: a PHY-layer parameter numerology of the licensed resource used to transmit the cached data, a TTI duration of the licensed resource used to transmit the cached data and a data size of the cached data.

The second parameter may include at least one of: a resource type of the PUCCH resource, a resource block identifier of the PUCCH resource and a total number of repeated SR transmission times on the PUCCH resource.

In a possible design, the PUCCH resource may include at least one of: a short-duration PUCCH resource and a long-duration PUCCH resource.

According to a third aspect, the embodiments of the disclosure provide a terminal, which has a function of implementing operations of the terminal in the method design. The function may be realized through hardware and may also be realized by executing corresponding software through the hardware. The hardware or the software includes one or more modules corresponding to the function.

In a possible design, the terminal includes a processor, and the processor is configured to support the terminal to realize the corresponding function in the method. Furthermore, the terminal may further include a communication interface, and the communication interface is configured to support communication between the terminal and a network-side device. Furthermore, the network-side device may further include a memory, and the memory is configured to be coupled to the processor, and stores a necessary program instruction and data of the terminal.

According to a fourth aspect, the embodiments of the disclosure provide a network-side device, which has a function of implementing operations of a network device in the method design. The function may be realized through hardware and may also be realized by executing corresponding software through the hardware. The hardware or the software includes one or more modules corresponding to the function.

In a possible design, the network-side device includes a processor, and the processor is configured to support the network-side device to realize the corresponding function in the method. Furthermore, the network-side device may further include a transceiver, and the transceiver is configured to support communication between the network-side device and the terminal. Furthermore, the network-side device may further include a memory, and the memory is configured to be coupled to the processor, and stores a necessary program instruction and data of the network-side device.

According to a fifth aspect, the embodiments of the disclosure provide a terminal, which may include one or more processors, a memory, a communication interface and one or more programs. The one or more programs may be stored in the memory and configured to be executed by the one or more processors, and the programs may include instructions configured to execute the operations in any method according to the second aspect of the embodiments of the disclosure.

According to a sixth aspect, the embodiments of the disclosure provide a network-side device, which may include one or more processors, a memory, a transceiver and one or more programs. The one or more programs may be stored in the memory and configured to be executed by the one or more processors, and the programs may include instructions configured to execute the operations in any method according to the first aspect of the embodiments of the disclosure.

According to a seventh aspect, the embodiments of the disclosure provide a computer-readable storage medium, which may store a computer program configured for electronic data exchange, the computer program enabling a computer to execute part or all of the operations described in any method according to the second aspect of the embodiments of the disclosure.

According to an eighth aspect, the embodiments of the disclosure provide a computer-readable storage medium, which may store a computer program configured for electronic data exchange, the computer program enabling a computer to execute part or all of the operations described in any method according to the first aspect of the embodiments of the disclosure.

According to a ninth aspect, the embodiments of the disclosure provide a computer program product, which includes a non-transitory computer-readable storage medium storing a computer program. The computer program may be operated to enable a computer to execute part or all of the operations described in any method according to the first aspect of the embodiments of the disclosure. The computer program product may be a software installation package.

According to a tenth aspect, the embodiments of the disclosure provide a computer program product, which includes a non-transitory computer-readable storage medium storing a computer program. The computer program may be operated to enable a computer to execute part or all of the operations described in any method according to the second aspect of the embodiments of the disclosure. The computer program product may be a software installation package.

BRIEF DESCRIPTION OF DRAWINGS

The drawings required to be used for descriptions about the embodiments or a conventional art will be simply introduced below.

DETAILED DESCRIPTION

The technical solutions in the embodiments of the disclosure will be described below in combination with the drawings.

Figure 1:
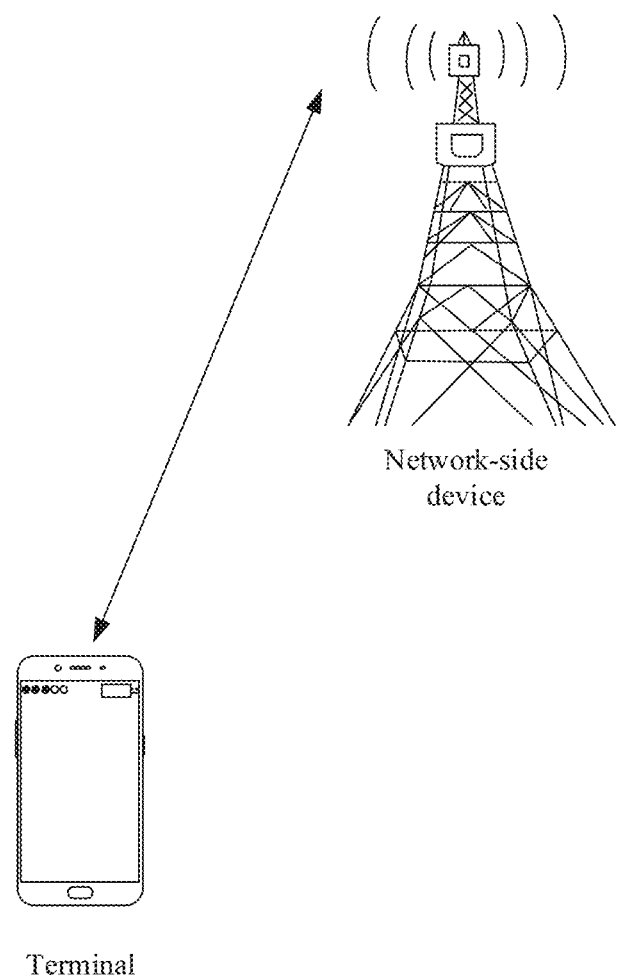
FIG. 1 is a network architecture diagram of an exemplary communication system according to an embodiment of the disclosure.

Referring to FIG. 1, FIG. 1 is a possible network architecture of an exemplary communication system according to an embodiment of the disclosure. The exemplary communication system may be a 4G LTE communication system or a 5G NR communication system, and specifically includes a network-side device and a terminal. When the terminal accesses a mobile communication network provided by the network-side device, the terminal forms a communication connection connected with the network-side device through a wireless link. Such a communication connection manner may be a single-connection manner or a dual-connection manner or a multi-connection manner. When the communication connection manner is the single-connection manner, the network-side device may be an LTE base station or an NR base station (also called a gNB). When the communication manner is the dual-connection manner (which may specifically be implemented by a Carrier Aggregation (CA) technology or implemented by multiple network-side devices), when the terminal is connected with the multiple network-side devices, the multiple network-side devices include a Master Cell Group (MCG) and Secondary Cell Groups (SCGs), data is transmitted back between the cell groups through backhauls, the MCG may be an LTE base station and the SCGs may be LTE base stations, or, the MCG may be an NR base station and the SCGs may be LTE base stations, or, the MCG may be an NR base station and the SCGs may be NR base stations.

In the embodiments of the disclosure, terms "network" and "system" are often used alternately and their meanings may be understood by those skilled in the art. A terminal involved in the embodiments of the disclosure may include various handheld devices, vehicle-mounted devices, wearable devices, computing devices or other processing devices connected to wireless modems, which have a wireless communication function, as well as UE, Mobile Stations (MSs), terminal devices and the like in various forms. For convenient description, the devices mentioned above are collectively referred to as terminals.

Figure 2:
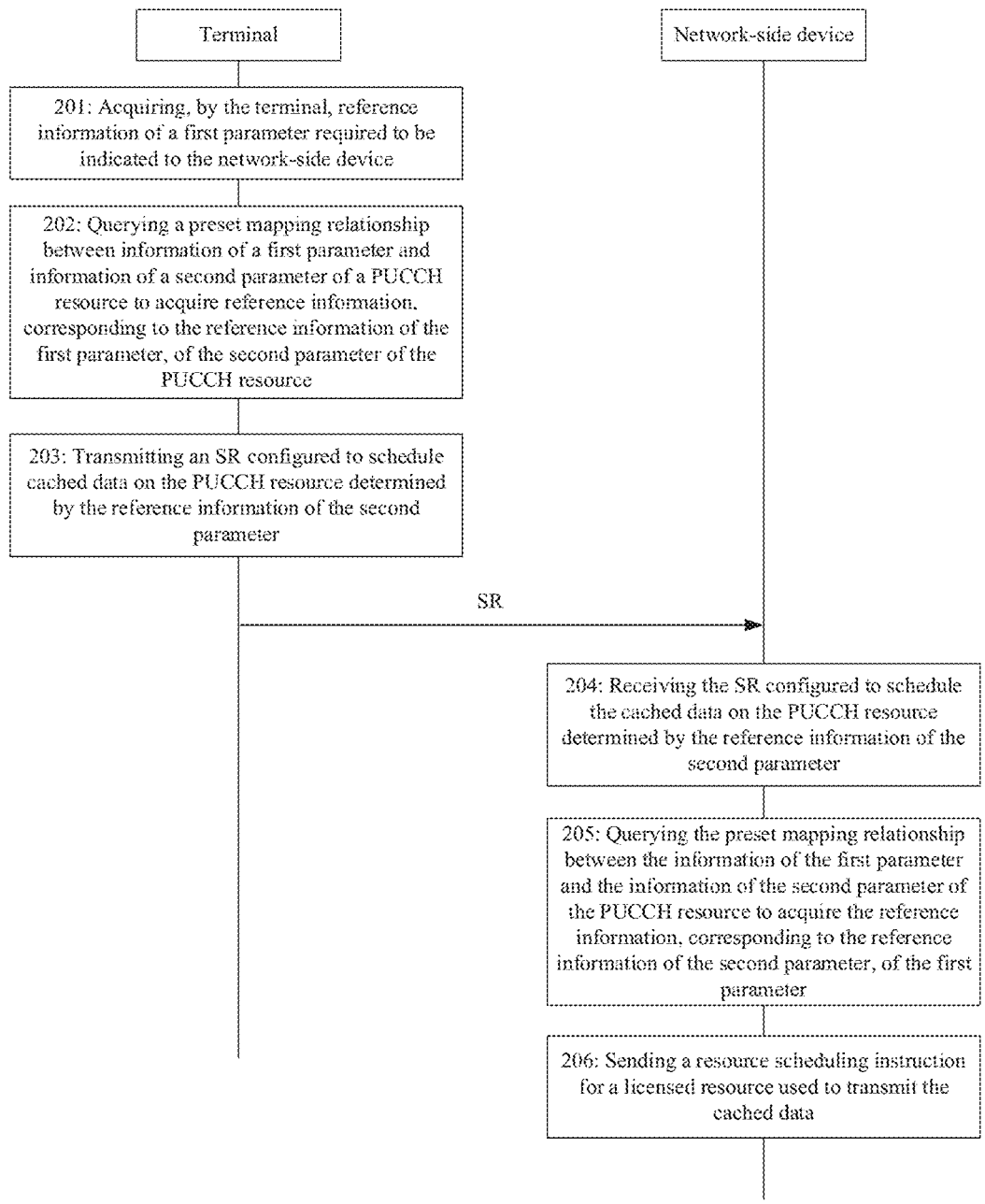
FIG. 2 is a communication schematic diagram of another SR transmission control method according to an embodiment of the disclosure.

Referring to FIG. 2, FIG. 2 illustrates an SR transmission control method according to an embodiment of the disclosure. The method includes the following operations.

In 201, a terminal acquires reference information of a first parameter required to be indicated to a network-side device, the first parameter being a parameter associated with cached data to be transmitted of the terminal, the reference information of the first parameter being used for the network-side device to determine a licensed resource and the licensed resource being used to transmit the cached data.

In 202, the terminal queries a preset mapping relationship between information of a first parameter and information of a second parameter of a PUCCH resource to acquire reference information, corresponding to the reference information of the first parameter, of the second parameter of the PUCCH resource, the second parameter being a parameter associated with the PUCCH resource used to transmit an SR.

In 203, the terminal transmits the SR used to schedule the cached data, on the PUCCH resource determined by the reference information of the second parameter.

In 204, the network-side device receives the SR used to schedule the cached data, on the PUCCH resource determined by the reference information of the second parameter, the second parameter being a parameter associated with the PUCCH resource used to transmit the SR.

In 205, the network-side device queries the preset mapping relationship between the information of the first parameter and the information of the second parameter of the PUCCH resource to acquire the reference information, corresponding to the reference information of the second parameter, of the first parameter, the first parameter being a parameter associated with the cached data to be transmitted of the terminal.

In 206, the network-side device sends a resource scheduling instruction for the licensed resource used to transmit the cached data, the resource scheduling instruction containing indication information of the licensed resource determined by the reference information of the second parameter.

It can be seen that, in the embodiment of the disclosure, the terminal acquires the reference information of the first parameter required to be indicated to the network-side device at first, then queries the preset mapping relationship between the information of the first parameter and the information of the second parameter of the PUCCH resource to acquire the reference information, corresponding to the reference information of the first parameter, of the second parameter of the PUCCH resource and finally transmits the SR used to schedule the cached data, on the PUCCH resource determined by the reference information of the second parameter. The network-side device receives the SR used to schedule the cached data, on the PUCCH resource determined by the reference information of the second parameter at first, then queries the preset mapping relationship between the information of the first parameter and the information of the second parameter of the PUCCH resource to acquire the reference information, corresponding to the reference information of the second parameter, of the first parameter and finally sends the resource scheduling instruction for the licensed resource used to transmit the cached data. Since the information of the first parameter forms the mapping relationship with the information of the second parameter, the SR may be transmitted to enable the network-side device to acquire the reference information, corresponding to the reference information of the second parameter, of the first parameter at the same time of receiving the SR and further learn configuration information of the licensed resource used to transmit the cached data, and no additional signaling overhead is required to transmit the configuration information of the licensed resource. Therefore, improvement in SR transmission flexibility of a wireless communication system and improvement in resource scheduling efficiency of the data transmission channel in the wireless communication system are facilitated.

In a possible example, before the operation that the terminal acquires the reference information of the first parameter required to be indicated to the network-side device, the method further includes the following operation.

The terminal acquires the cached data.

In a possible example, the operation that the terminal acquires the reference information of the first parameter required to be indicated to the network-side device includes the following operation.

Responsive to detecting that no UL-SCH resource is obtained to transmit the cached data, the terminal acquires the reference information of the first parameter required to be indicated to the network-side device.

It can be seen that, in the example, the terminal specifically acquires the reference information of the first parameter required to be indicated to the network-side device responsive to detecting that no UL-SCH resource is obtained to transmit the cached data in a present TTI. In such a manner, the terminal may dynamically configure reference information of an alternative resource used to transmit the cached data, i.e., the reference information of the first parameter, in real time according to a transmission resource scheduling condition of the cached data and then transmit the SR to synchronously indicate the reference information of the first parameter to the network-side device to enable the network-side device to timely acquire the reference information of the alternative resource, so that the configuration information of the licensed resource transmitting the cached data may be accurately determined, and improvement in resource scheduling flexibility and real-time performance of the wireless communication system is facilitated.

In a possible example, after the operation that the terminal transmits the SR used to schedule the cached data, on the PUCCH resource determined by the reference information of the second parameter, the method further includes that: the terminal receives the cached data on the licensed resource determined by the reference information of the first parameter.

After the operation that the network-side device sends the resource scheduling instruction for the licensed resource used to transmit the cached data, the method further includes that: the network-side device receives the cached data on the licensed resource determined by the reference information of the second parameter.

In a possible example, the cached data includes at least one of: data cached in an RLC layer of the terminal and data cached in a PDCP layer of the terminal.

In a possible example, the parameter associated with the cached data to be transmitted of the terminal includes any one of: a PHY-layer parameter numerology of the licensed resource used to transmit the cached data, a TTI duration of the licensed resource used to transmit the cached data and a data size of the cached data.

The second parameter includes at least one of: a resource type of the PUCCH resource, a resource block identifier of the PUCCH resource and a total number of repeated SR transmission times on the PUCCH resource.

In a possible example, the PUCCH resource includes at least one of: a short-duration PUCCH resource and a long-duration PUCCH resource.

The embodiment of the disclosure will specifically be described below in combination with specific application scenarios.

Figure 3A:
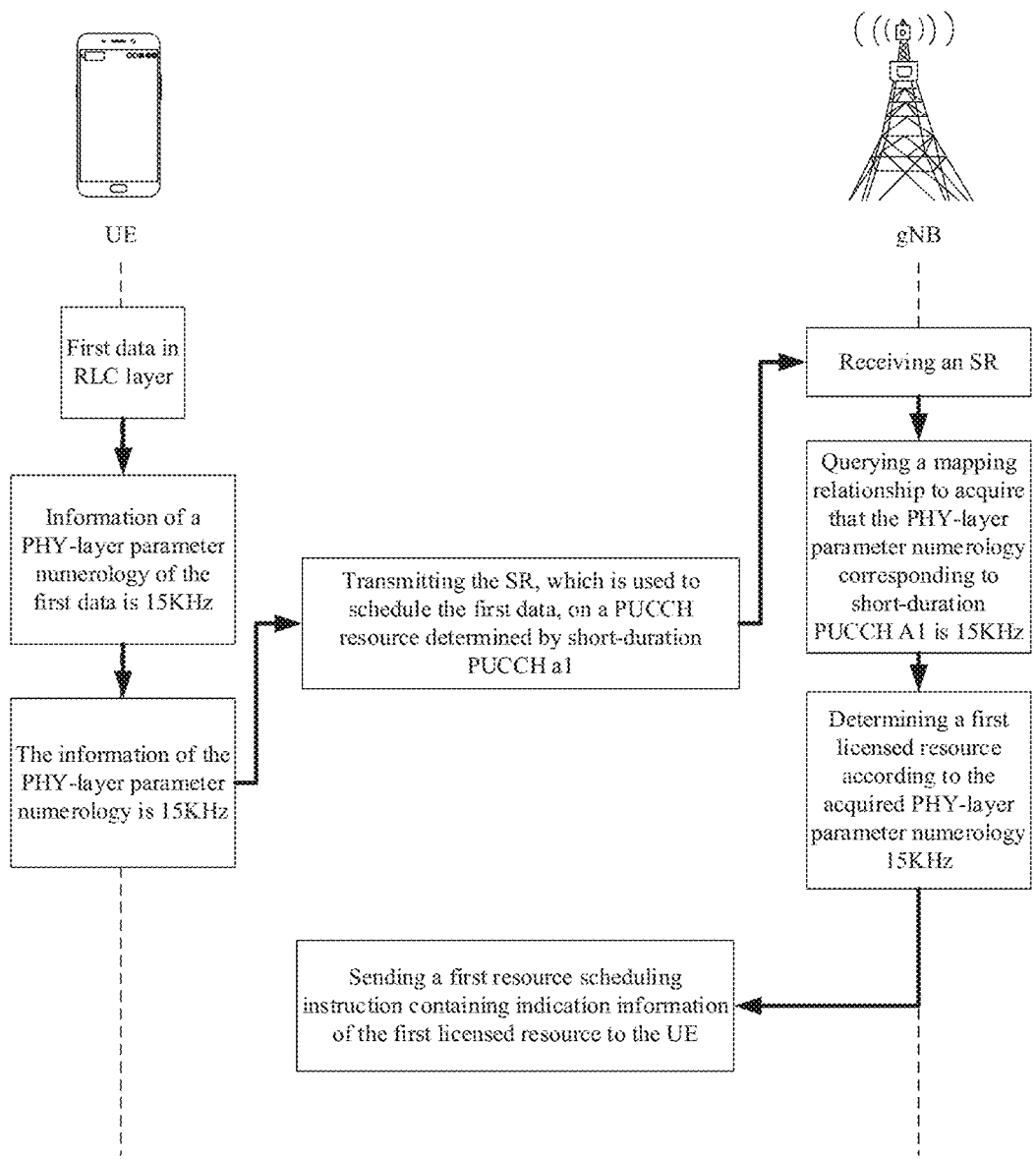
FIG. 3A is a schematic diagram of an SR transmission control method in a 5G NR scenario according to an embodiment of the disclosure.

Referring to FIG. 3A, the network-side device is a gNB in 5G NR, the terminal is UE in 5G NR, the cached data acquired by the terminal is first data cached in an RLC layer of the UE, a PUCCH resource used to transmit an SR for the first data is a short-duration PUCCH resource, a second parameter of the PUCCH resource is a resource block identifier of the PUCCH resource, information of the second parameter specifically includes short-duration PUCCH A1 and short-duration PUCCH A2, a first parameter of the first data is a PHY-layer parameter numerology, information of the first parameter specifically includes 15 KHz and 30 KHz, and a mapping relationship, pre-configured by the UE through a high layer of a protocol stack, between information of a first parameter and information of a second parameter is shown in Table 2.

TABLE 2

| PUCCH resource block identifier | PHY-layer parameter Numerology |
| --- | --- |
| Short-duration PUCCH A1 | 15 KHz |
| Short-duration PUCCH A2 | 30 KHz |

The UE determines that the information of the PHY-layer parameter numerology of the first data is 15 KHz, and then the UE selects short-duration PUCCH A1 and transmits the SR configured to schedule the first data on a PUCCH resource determined by short-duration PUCCH A1. The gNB receives the SR, queries the mapping relationship to acquire that the PHY-layer parameter numerology corresponding to short-duration PUCCH A1 is 15 KHz, determines a first licensed resource according to the acquired PHY-layer parameter numerology 15 KHz and sends a first resource scheduling instruction containing indication information of the first licensed resource to the UE.

Figure 3B:
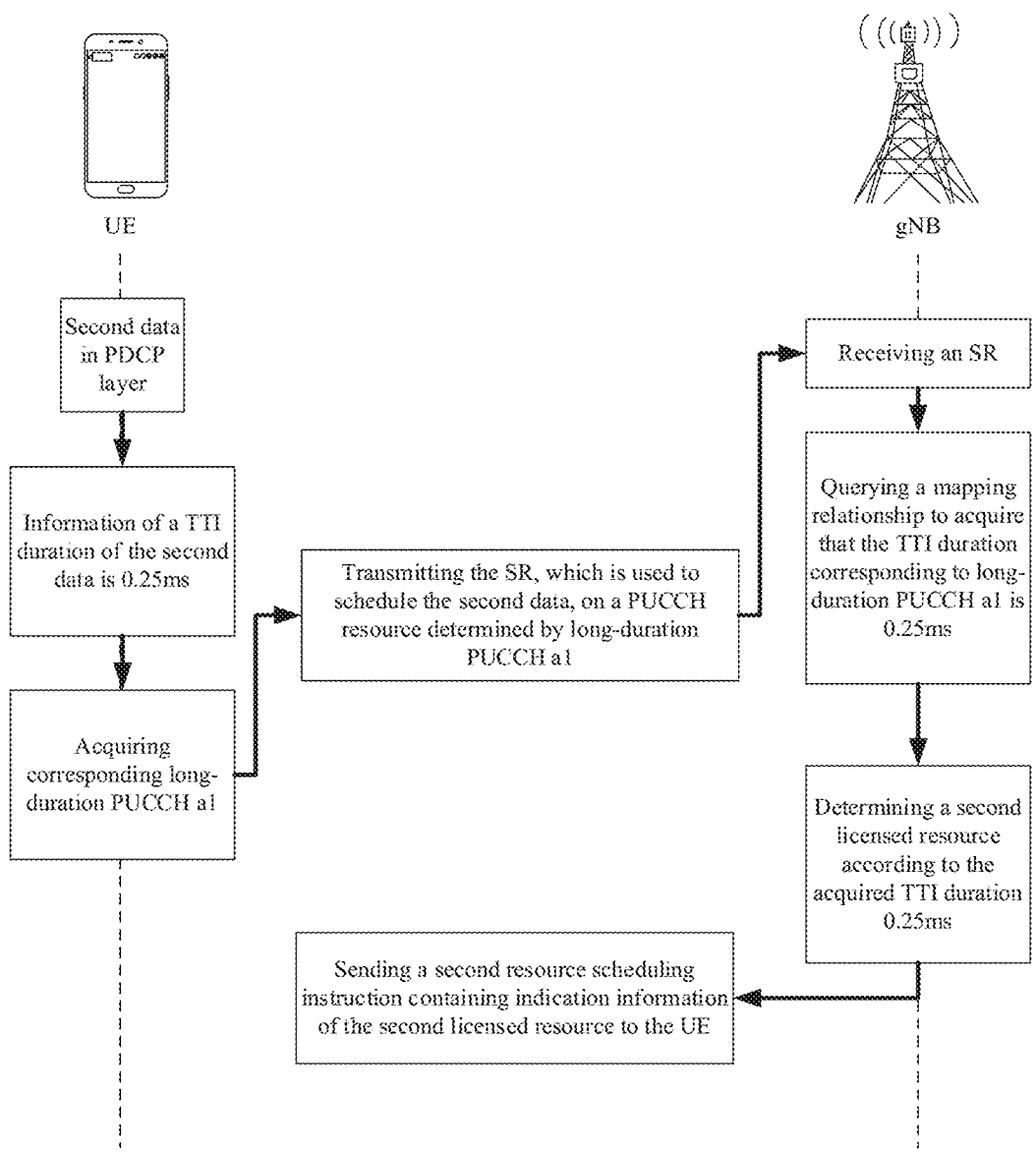
FIG. 3B is a schematic diagram of an SR transmission control method in another 5G NR scenario according to an embodiment of the disclosure.

Referring to FIG. 3B, the network-side device is a gNB in 5G NR, the terminal is UE in 5G NR, the cached data acquired by the terminal is second data cached in a PDCP layer of the UE, a PUCCH resource used to transmit an SR for the second data is a long-duration PUCCH resource, a second parameter of the PUCCH resource is a resource block identifier of the PUCCH resource, information of the second parameter specifically includes long-duration PUCCH B1 and long-duration PUCCH B2, a first parameter of the second data is a TTI duration, information of the first parameter specifically includes 0.25 ms and 0.5 ms, and a mapping relationship, pre-configured by the UE through a high layer of a protocol stack, between information of a first parameter and information of a second parameter is shown in Table 2.

TABLE 2

| PUCCH resource block identifier | TTI duration |
| --- | --- |
| Long-duration PUCCH B1 | 0.25 ms |
| Long-duration PUCCH B2 | 0.5 ms |

The UE determines that the information of the TTI duration of the second data is 0.25 ms, and then the UE acquires long-duration PUCCH a1 and transmits the SR configured to schedule the second data on a PUCCH resource determined by long-duration PUCCH B1. The gNB receives the SR, queries the mapping relationship to acquire that the TTI duration corresponding to long-duration PUCCH B1 is 0.25 ms, determines a second licensed resource according to the acquired TTI duration 0.25 ms and sends a second resource scheduling instruction containing indication information of the second licensed resource to the UE.

Figure 3C:
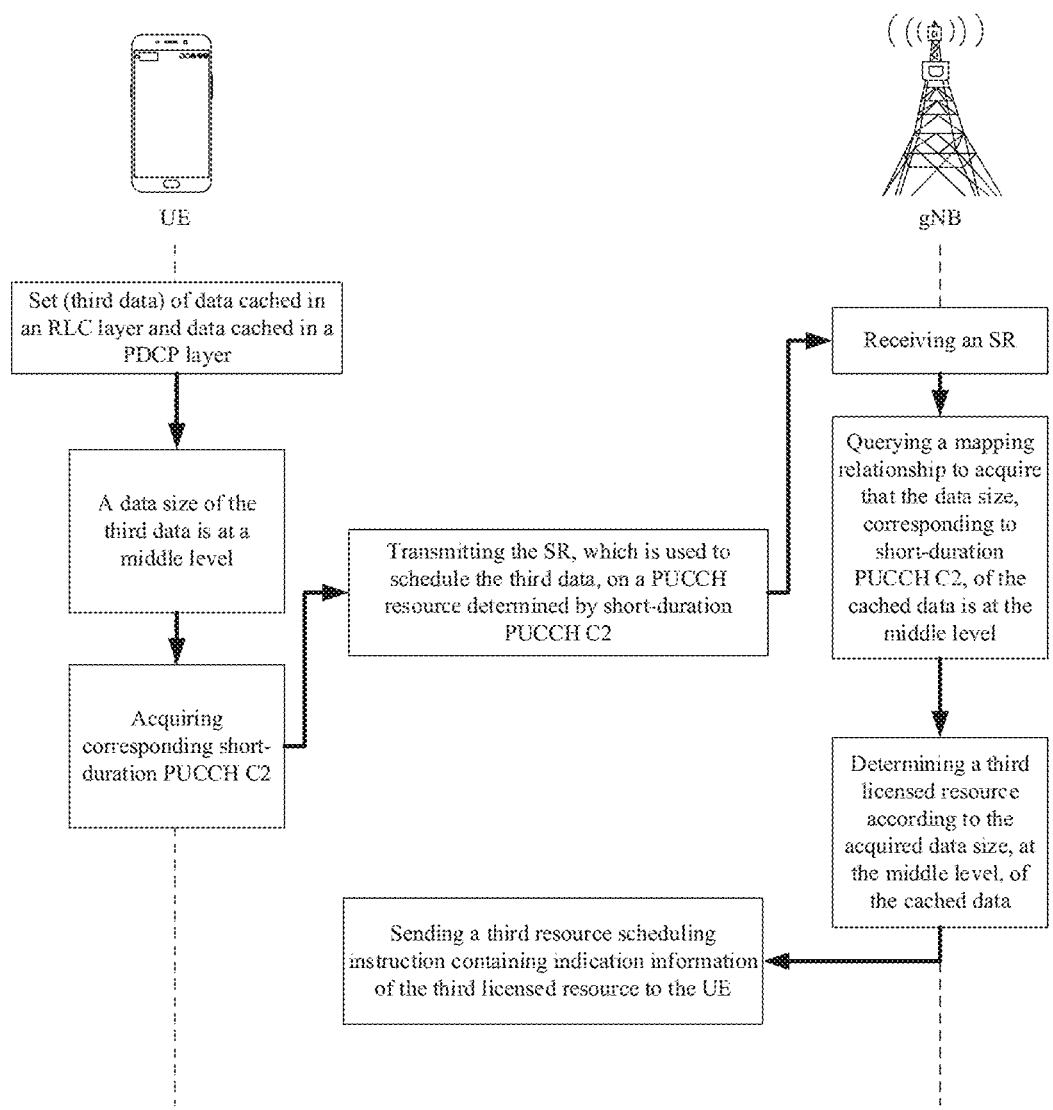
FIG. 3C is a schematic diagram of an SR transmission control method in another 5G NR scenario according to an embodiment of the disclosure.

Referring to FIG. 3C, the network-side device is a gNB in 5G NR, the terminal is UE in 5G NR, the cached data acquired by the terminal is a set (called this data) of data cached in an RLC layer and data cached in a PDCH layer in the UE, a PUCCH resource used to transmit an SR for the third data is a short-duration PUCCH resource, a second parameter of the PUCCH resource is a resource block identifier of the PUCCH resource, information of the second parameter specifically includes short-duration PUCCH C1, short-duration PUCCH C2 and short-duration PUCCH C3, a first parameter of the third data is a data size of the cached data, information of the first parameter specifically includes three different levels, i.e., a low level, a middle level and a high level, and a mapping relationship, pre-configured by the UE through a high layer of a protocol stack, between information of a first parameter and information of a second parameter is shown in Table 3.

TABLE 3

| PUCCH resource block identifier | Data size of cached data |
|---|---|
| Short-duration PUCCH C1 | High level |
| Short-duration PUCCH C2 | Middle level |
| Short-duration PUCCH C3 | Low level |

The UE determines that the data size of the third data is at the middle level, and then the UE acquires corresponding short-duration PUCCH C2 and transmits the SR configured to schedule the third data on a PUCCH resource determined by short-duration PUCCH C2. The gNB receives the SR, queries the mapping relationship to acquire that the data size, corresponding to short-duration PUCCH C2, of the cached data is at the middle level, determines a third licensed resource according to the acquired data size, at the middle level, of the cached data and sends a third resource scheduling instruction containing indication information of the third licensed resource to the UE.

Figure 3D:
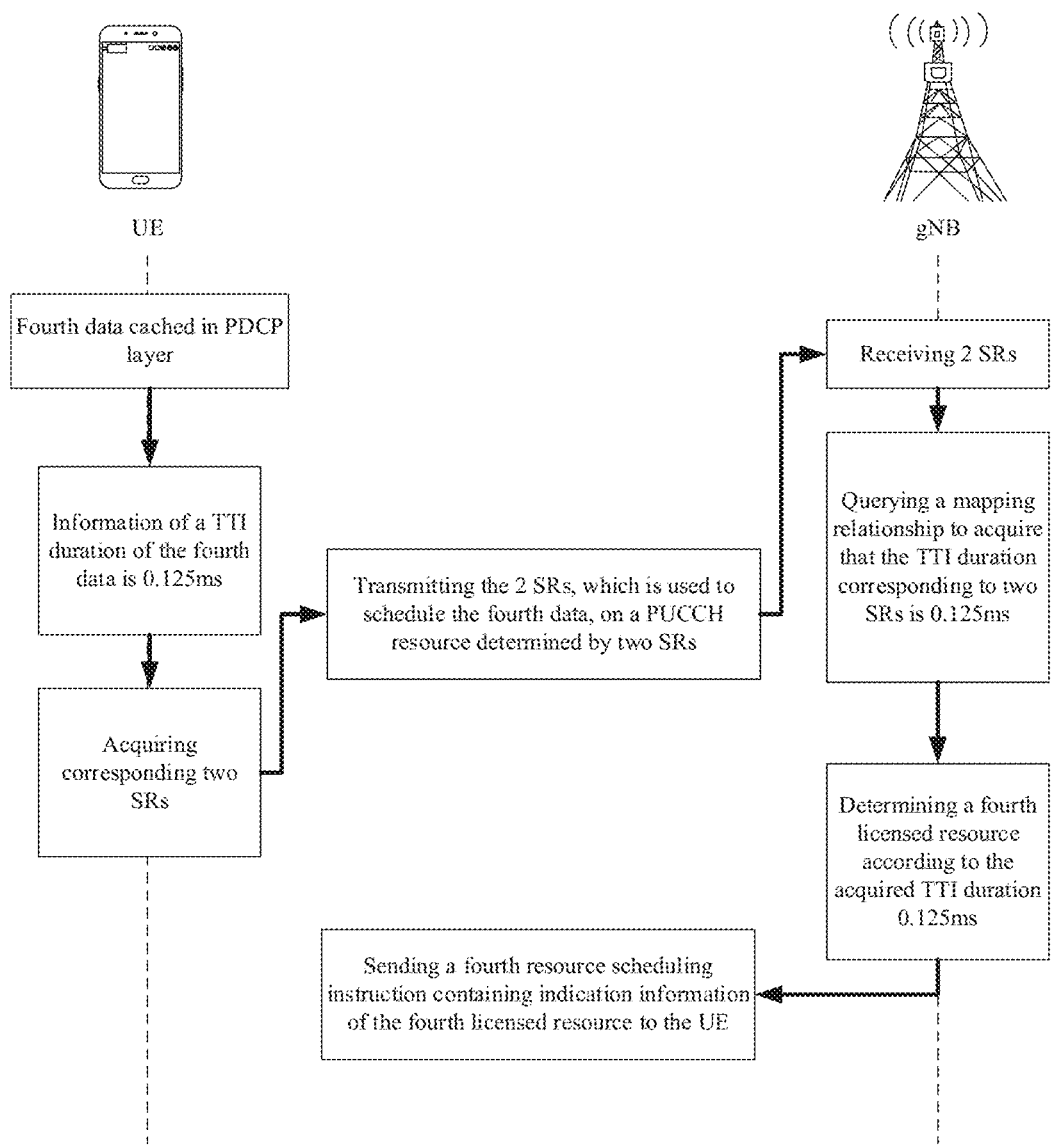
FIG. 3D is a schematic diagram of an SR transmission control method in another 5G NR scenario according to an embodiment of the disclosure.

Referring to FIG. 3D, the network-side device is a gNB in 5G NR, the terminal is UE in 5G NR, the cached data acquired by the terminal is fourth data cached in a PDCP layer of the UE, a PUCCH resource used to transmit an SR for the fourth data is a long-duration PUCCH resource, a second parameter of the PUCCH resource is a total number of repeated SR transmission times on the PUCCH resource, information of the second parameter specifically includes single SR (once) and two SRs (twice), a first parameter of the fourth data is a TTI duration, information of the first parameter specifically includes 0.25 ms and 0.125 ms, and a mapping relationship, pre-configured by the UE through a high layer of a protocol stack, between information of a first parameter and information of a second parameter is shown in Table 4.

TABLE 4

| Number of repeated SR transmission times on PUCCH resource | TTI duration |
|---|---|
| Single SR | 0.25 ms |
| Two SRs | 0.125 ms |

The UE determines that the information of the TTI duration of the fourth data is 0.125 ms, and then the UE acquires corresponding two SRs and transmits 2 SRs configured to schedule the fourth data on a PUCCH resource determined by two SRs. The gNB receives the 2 SRs, queries the mapping relationship to acquire that the TTI duration corresponding to two SRs is 0.125 ms, determines a fourth licensed resource according to the acquired TTI duration 0.125 ms and sends a fourth resource scheduling instruction containing indication information of the fourth licensed resource to the UE.

Figure 3E:
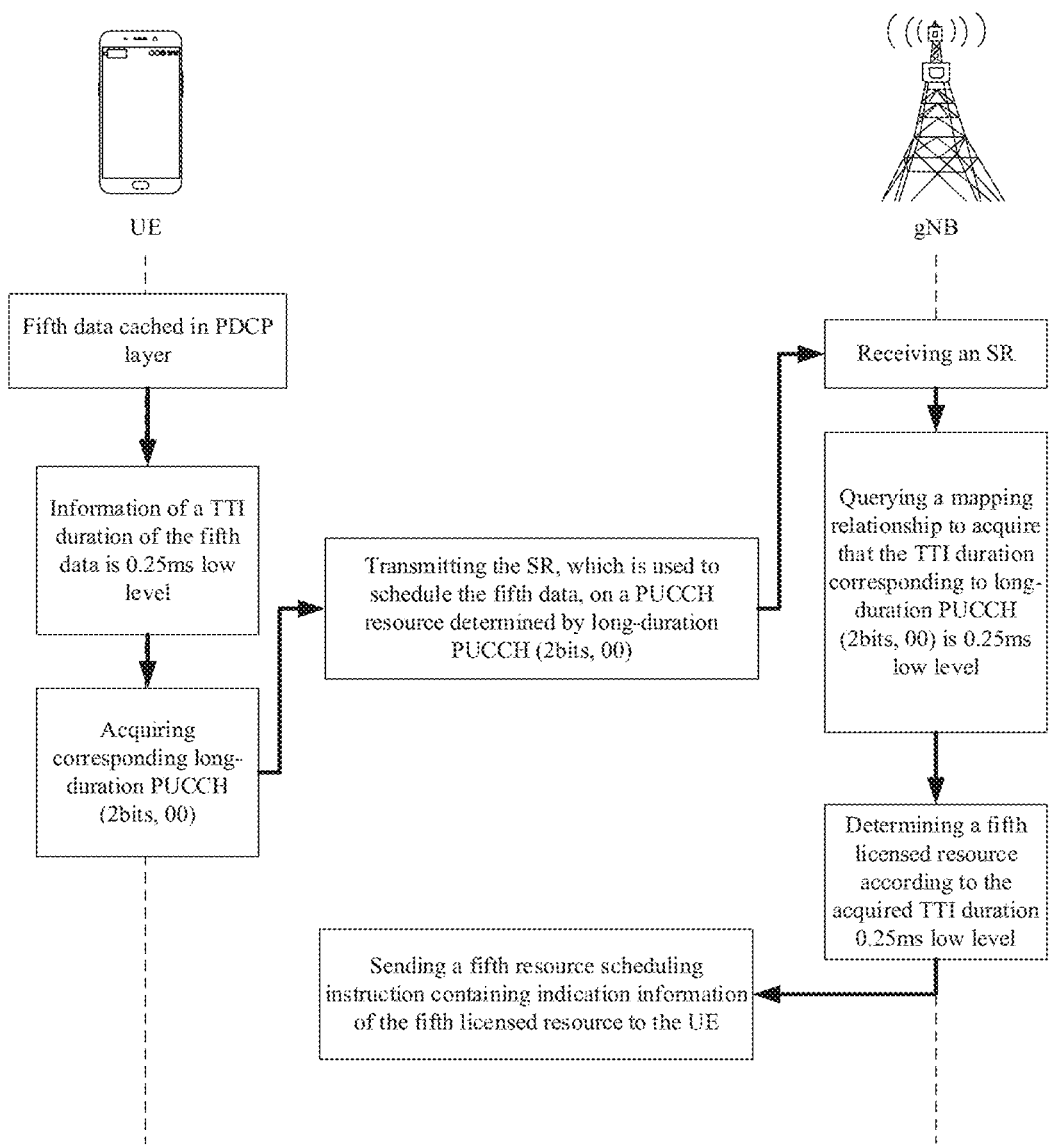
FIG. 3E is a schematic diagram of an SR transmission control method in another 5G NR scenario according to an embodiment of the disclosure.

Referring to FIG. 3E, the network-side device is a gNB in 5G NR, the terminal is UE in 5G NR, the cached data acquired by the terminal is fifth data cached in a PDCP layer of the UE, a PUCCH resource used to transmit an SR for the fifth data is a long-duration PUCCH resource or a short-duration PUCCH resource, a second parameter of the PUCCH resource is a PUCCH resource type, a bit number of bits of the SR and bearer information, information of the second parameter specifically includes long-duration PUCCH (2 bits, 00), long-duration PUCCH (2 bits, 01), long-duration PUCCH (2 bits, 10), long-duration PUCCH (2 bits, 11) and short-duration PUCCH (1 bits, 0/1), a first parameter of the fifth data is a TTI duration, information of the first parameter specifically includes 0.25 ms low level, 0.25 ms high level, 0.5 ms low level, 0.5 ms high level and 1 ms, and a mapping relationship, pre-configured by the UE through a high layer of a protocol stack, between information of a first parameter and information of a second parameter is shown in Table 5.

TABLE 5

| PUCCH resource type | Bit number of bits of SR and bearer information | TTI duration |
|---|---|---|
| Long-duration PUCCH | (2 bits, 00) | 0.25 ms low level |
| Long-duration PUCCH | (2 bits, 01) | 0.25 ms high level |
| Long-duration PUCCH | (2 bits, 10) | 0.5 ms low level |
| Long-duration PUCCH | (2 bits, 11) | 0.5 ms high level |
| Short-duration PUCCH | (1 bits, 0/1) | 1 ms |

The UE determines that the information of the TTI duration of the second data is 0.25 ms low level, and then the UE acquires corresponding long-duration PUCCH (2 bits, 00) and transmits the SR configured to schedule the fifth data on a PUCCH resource determined by long-duration PUCCH (2 bits, 00). The gNB receives the SR, queries the mapping relationship to acquire that the TTI duration corresponding to long-duration PUCCH (2 bits, 00) is 0.25 ms low level, determines a fifth licensed resource according to the acquired TTI duration 0.25 ms low level and sends a fifth resource scheduling instruction containing indication information of the fifth licensed resource to the UE.

Figure 3F:
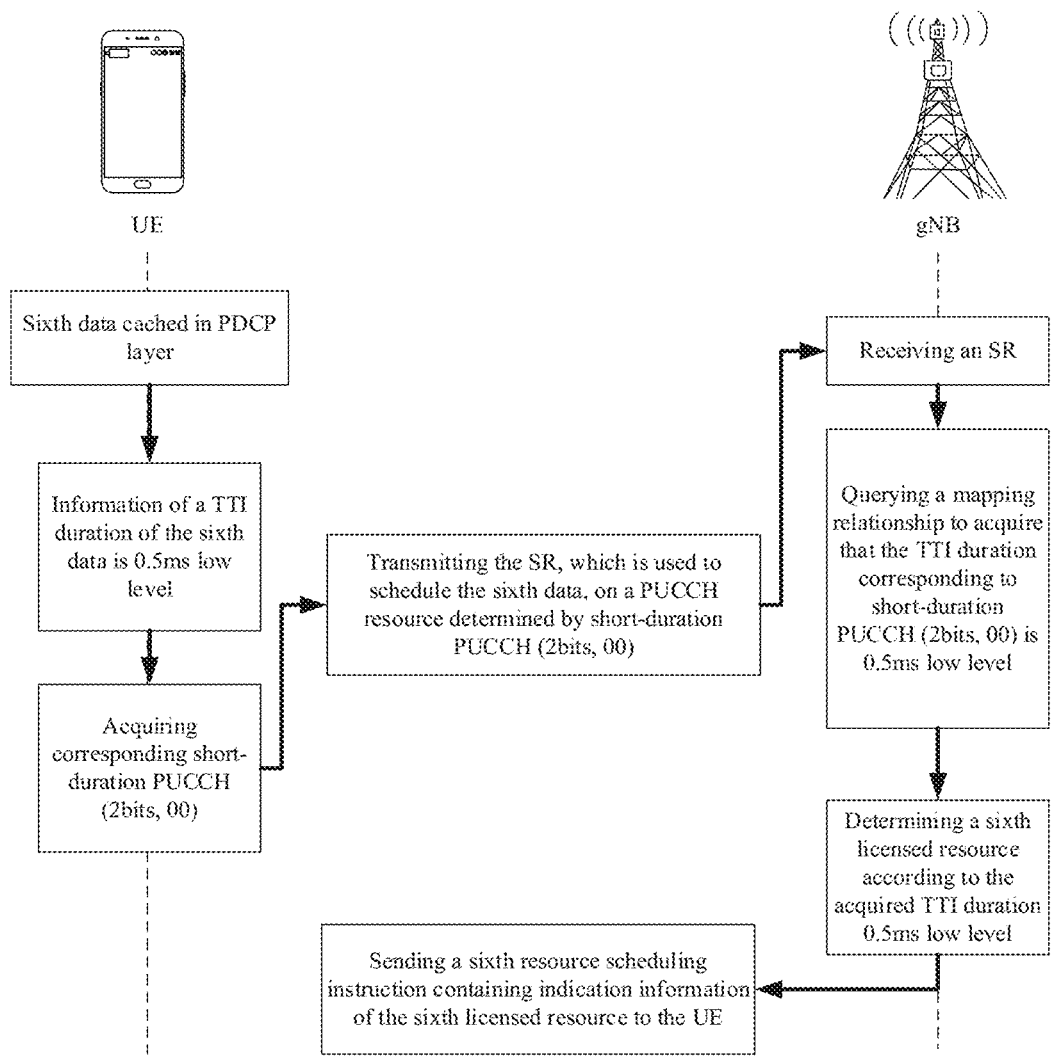
FIG. 3F is a schematic diagram of an SR transmission control method in another 5G NR scenario according to an embodiment of the disclosure.

Referring to FIG. 3F, the network-side device is a gNB in 5G NR, the terminal is UE in 5G NR, the cached data acquired by the terminal is sixth data cached in a PDCP layer of the UE, a PUCCH resource used to transmit an SR for the sixth data is a long-duration PUCCH resource or a short-duration PUCCH resource, a second parameter of the PUCCH resource is a PUCCH resource type, a bit number of bits of the SR and bearer information, information of the second parameter specifically includes long-duration PUCCH (2 bits, 00), long-duration PUCCH (2 bits, 01), long-duration PUCCH (2 bits, 10), long-duration PUCCH (2 bits, 11), short-duration PUCCH (1 bits, 00), short-duration PUCCH (2 bits, 01), short-duration PUCCH (2 bits, 10) and short-duration PUCCH (2 bits, 11), a first parameter of the sixth data is a TTI duration, information of the first parameter specifically includes 0.125 ms low level, 0.125 ms high level, 0.25 ms low level, 0.25 ms high level, 0.5 ms low level, 0.5 ms high level, 1 ms low level and 1 ms high level, and a mapping relationship, pre-configured by the UE through a high layer of a protocol stack, between information of a first parameter and information of a second parameter is shown in Table 6.

TABLE 6

| PUCCH resource type | Bit number of bits of SR and bearer information | TTI duration |
| --- | --- | --- |
| Long-duration PUCCH | (2 bits, 00) | 0.125 ms low level |
| Long-duration PUCCH | (2 bits, 01) | 0.125 ms high level |
| Long-duration PUCCH | (2 bits, 10) | 0.25 ms low level |
| Long-duration PUCCH | (2 bits, 11) | 0.25 ms high level |
| Short-duration PUCCH | (2 bits, 00) | 0.5 ms low level |
| Short-duration PUCCH | (2 bits, 01) | 0.5 ms high level |
| Short-duration PUCCH | (2 bits, 10) | 1 ms low level |
| Short-duration PUCCH | (2 bits, 11) | 1 ms high level |

The UE determines that the information of the TTI duration of the sixth data is 0.5 ms low level, and then the UE acquires corresponding short-duration PUCCH (2 bits, 00) and transmits the SR configured to schedule the sixth data on a PUCCH resource determined by short-duration PUCCH (2 bits, 00). The gNB receives the SR, queries the mapping relationship to acquire that the TTI duration corresponding to short-duration PUCCH (2 bits, 00) is 0.5 ms low level, determines a sixth licensed resource according to the acquired TTI duration 0.5 ms low level and sends a sixth resource scheduling instruction containing indication information of the sixth licensed resource to the UE.

Figure 4:
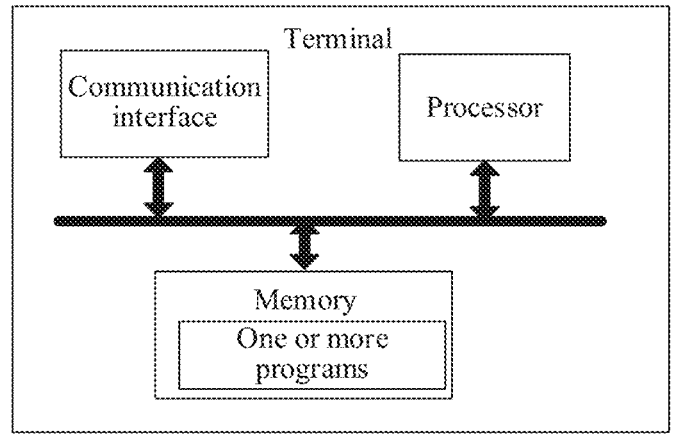
FIG. 4 is a structure diagram of a terminal according to an embodiment of the disclosure.

Consistent with the embodiment shown in FIG. 2, referring to FIG. 4, FIG. 4 is a structure diagram of a terminal according to an embodiment of the disclosure. As shown in the figure, the terminal includes one or more processors, a memory, a communication interface and one or more programs. The one or more programs are stored in the memory and are configured to be executed by the one or more processors. The programs include instructions configured to execute the following operations.

Reference information of a first parameter required to be indicated to a network-side device is acquired, the first parameter being a parameter associated with cached data to be transmitted of the terminal, the reference information of the first parameter being used for the network-side device to determine a licensed resource and the licensed resource being used to transmit the cached data.

A preset mapping relationship between information of a first parameter and information of a second parameter of a PUCCH resource is queried to acquire reference information, corresponding to the reference information of the first parameter, of the second parameter of the PUCCH resource, the second parameter being a parameter associated with the PUCCH resource used to transmit an SR.

The SR configured to schedule the cached data is transmitted on the PUCCH resource determined by the reference information of the second parameter.

It can be seen that, in the embodiment of the disclosure, the terminal acquires the reference information of the first parameter required to be indicated to the network-side device at first, then queries the preset mapping relationship between the information of the first parameter and the information of the second parameter of the PUCCH resource to acquire the reference information, corresponding to the reference information of the first parameter, of the second parameter of the PUCCH resource and finally transmits the SR used to schedule the cached data, on the PUCCH resource determined by the reference information of the second parameter. Since the information of the first parameter forms the mapping relationship with the information of the second parameter, the SR may be transmitted to enable the network-side device to acquire the reference information, corresponding to the reference information of the second parameter, of the first parameter at the same time of receiving the SR and further learn configuration information of the licensed resource used to transmit the cached data, and no additional signaling overhead is required to transmit the configuration information of the licensed resource. Therefore, improvement in SR transmission flexibility of a wireless communication system and improvement in resource scheduling efficiency of the data transmission channel in the wireless communication system are facilitated.

In a possible example, the programs further include an instruction configured to execute the following operation: before the reference information of the first parameter required to be indicated to the network-side device is acquired, the cached data is acquired.

In a possible example, on the aspect of acquiring the reference information of the first parameter required to be indicated to the network-side device, the instructions in the programs are specifically configured to execute the following operation: responsive to detecting that no UL-SCH resource is obtained to transmit the cached data, the reference information of the first parameter required to be indicated to the network-side device is acquired.

In a possible example, the cached data includes at least one of: data cached in an RLC layer of the terminal and data cached in a PDCP layer of the terminal.

In a possible example, the parameter associated with the cached data to be transmitted of the terminal includes any one of: a PHY-layer parameter numerology of the licensed resource used to transmit the cached data, a TTI duration of the licensed resource used to transmit the cached data and a data size of the cached data.

The second parameter includes at least one of: a resource type of the PUCCH resource, a resource block identifier of the PUCCH resource and a total number of repeated SR transmission times on the PUCCH resource.

In a possible example, the PUCCH resource includes at least one of: a short-duration PUCCH resource and a long-duration PUCCH resource.

Figure 5:
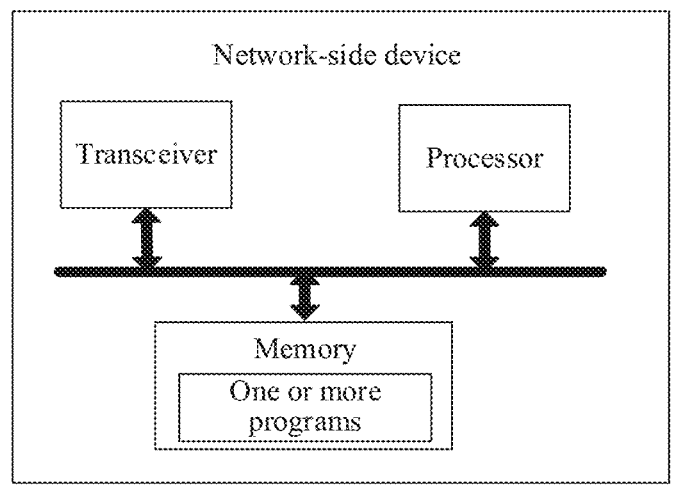
FIG. 5 is a structure diagram of a network-side device according to an embodiment of the disclosure.

Consistent with the embodiment shown in FIG. 2, referring to FIG. 5, FIG. 5 is a structure diagram of a network-side device according to an embodiment of the disclosure. As shown in the figure, the network-side device includes one or more processors, a memory, a transceiver and one or more programs. The one or more programs are stored in the memory and are configured to be executed by the one or more processors. The programs include instructions configured to execute the following operations.

An SR configured to schedule cached data is received on a PUCCH resource determined by reference information of a second parameter, the second parameter being a parameter associated with the PUCCH resource used to transmit the SR.

A preset mapping relationship between information of a first parameter and information of a second parameter of a PUCCH resource is queried to acquire reference information, corresponding to the reference information of the second parameter, of the first parameter, the first parameter being a parameter associated with the cached data to be transmitted of a terminal.

A resource scheduling instruction for a licensed resource used to transmit the cached data is sent, the resource scheduling instruction containing indication information of the licensed resource determined by the reference information of the second parameter.

It can be seen that, in the embodiment of the disclosure, the network-side device receives the SR used to schedule the cached data, on the PUCCH resource determined by the reference information of the second parameter at first, then queries the preset mapping relationship between the information of the first parameter and the information of the second parameter of the PUCCH resource to acquire the reference information, corresponding to the reference information of the second parameter, of the first parameter and finally sends the resource scheduling instruction for the licensed resource used to transmit the cached data. Since the information of the first parameter forms the mapping relationship with the information of the second parameter, the SR may be transmitted to enable the network-side device to acquire the reference information, corresponding to the reference information of the second parameter, of the first parameter at the same time of receiving the SR and further learn configuration information of the licensed resource used to transmit the cached data, and no additional signaling overhead is required to transmit the configuration information of the licensed resource. Therefore, improvement in SR transmission flexibility of a wireless communication system and improvement in resource scheduling efficiency of the data transmission channel in the wireless communication system are facilitated.

In a possible example, the programs further include an instruction configured to execute the following operation: after the resource scheduling instruction for the licensed resource used to transmit the cached data, the cached data is received on the licensed resource determined by the reference information of the second parameter.

In a possible example, the cached data includes at least one of: data cached in an RLC layer of the terminal and data cached in a PDCP layer of the terminal.

In a possible example, the parameter associated with the cached data to be transmitted of the terminal includes any one of: a PHY-layer parameter numerology of the licensed resource used to transmit the cached data, a TTI duration of the licensed resource used to transmit the cached data and a data size of the cached data.

The second parameter includes at least one of: a resource type of the PUCCH resource, a resource block identifier of the PUCCH resource and a total number of repeated SR transmission times on the PUCCH resource.

In a possible example, the PUCCH resource includes at least one of: a short-duration PUCCH resource and a long-duration PUCCH resource.

The solutions of the embodiments of the disclosure are introduced mainly from the angle of interaction between each network element. It can be understood that, for realizing the functions, the terminal and the network-side device include corresponding hardware structures and/or software modules executing each function. Those skilled in the art may easily realize that the units and algorithm operations of each example described in combination with the embodiments disclosed in the disclosure may be implemented by hardware or a combination of the hardware and computer software in the disclosure. Whether a certain function is executed by the hardware or in a manner of driving the hardware by the computer software depends on specific applications and design constraints of the technical solutions. Professionals may realize the described functions for each specific application by use of different methods, but such realization shall fall within the scope of the disclosure.

According to the embodiments of the disclosure, functional units of the terminal and the network-side device may be divided according to the abovementioned method examples. For example, each functional unit may be divided correspondingly to each function and two or more than two functions may also be integrated into a processing unit. The integrated unit may be implemented in a hardware form and may also be implemented in form of software program module. It is to be noted that division of the units in the embodiment of the disclosure is schematic and only logical function division and another division manner may be adopted during practical implementation.

Figure 6:
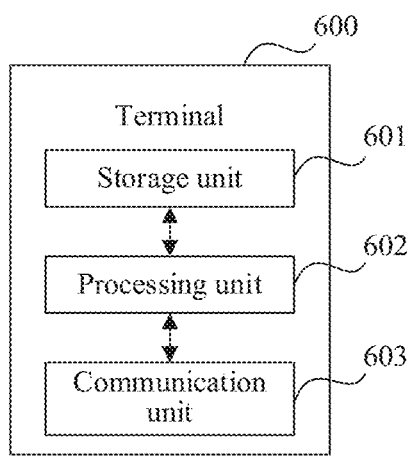
FIG. 6 is a block diagram of a composition of functional units of a terminal according to an embodiment of the disclosure.

Under the condition that an integrated unit is adopted, FIG. 6 is a possible functional unit composition block diagram of a terminal involved in the abovementioned embodiments. The terminal 600 includes a processing unit 602 and a communication unit 603. The processing unit 602 is configured to control and manage an operation of the terminal. For example, the processing unit 602 is configured to support the terminal to execute 201-203 in FIG. 2, and/or is configured for another process of a technology described in the disclosure. The communication unit 603 is configured to support communication between the terminal and another device, for example, communication with the network-side device shown in FIG. 5. The terminal may further include a storage unit 601, configured to store a program code and data of the terminal.

The processing unit 602 may be a processor or a controller, which may be, for example, a Central Processing Unit (CPU), a universal processor, a Digital Signal Processor (DSP), an Application-Specific Integrated Circuit (ASIC), a Field Programmable Gate Array (FPGA) or another programmable logical device, transistor logical device, hardware component or any combination thereof. It may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The communication unit 603 may be a transceiver, a transceiver circuit and the like. The storage unit 601 may be a memory.

When the processing unit 602 is a processor, the communication unit 603 is a communication interface and the storage unit 601 is a memory, the terminal involved in the embodiment of the disclosure may be the terminal shown in FIG. 4.

Figure 7:
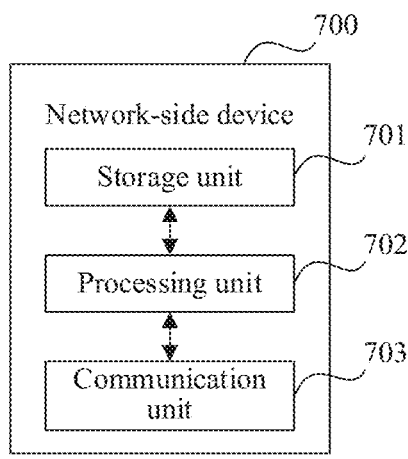
FIG. 7 is a block diagram of a composition of functional units of a network-side device according to an embodiment of the disclosure.

Under the condition that an integrated unit is adopted, FIG. 7 is a possible functional unit composition block diagram of a network-side device involved in the abovementioned embodiments. The network-side device 700 includes a processing unit 702 and a communication unit 703. The processing unit 702 is configured to control and manage an operation of the network-side device. For example, the processing unit 702 is configured to support the network-side device to execute 204 to 206 in FIG. 2, and/or is configured for another process of the technology described in the disclosure. The communication unit 703 is configured to support communication between the network-side device and another device, for example, communication with the terminal shown in FIG. 4. The network-side device may further include a storage unit 701, configured to store a program code and data of the network-side device.

In an embodiment, the processing unit 702 may be a processor or a controller, which may be, for example, a CPU, a universal processor, a DSP, an ASIC, an FPGA or another programmable logical device, transistor logical device, hardware component or any combination thereof. It may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The communication unit 703 may be a transceiver, a transceiver circuit, a Radio Frequency (RF) chip and the like. The storage unit 701 may be a memory.

When the processing unit 702 is a processor, the communication unit 703 is a communication interface and the storage unit 701 is a memory, the network-side device involved in the embodiment of the disclosure may be the network-side device shown in FIG. 5.

Figure 8:
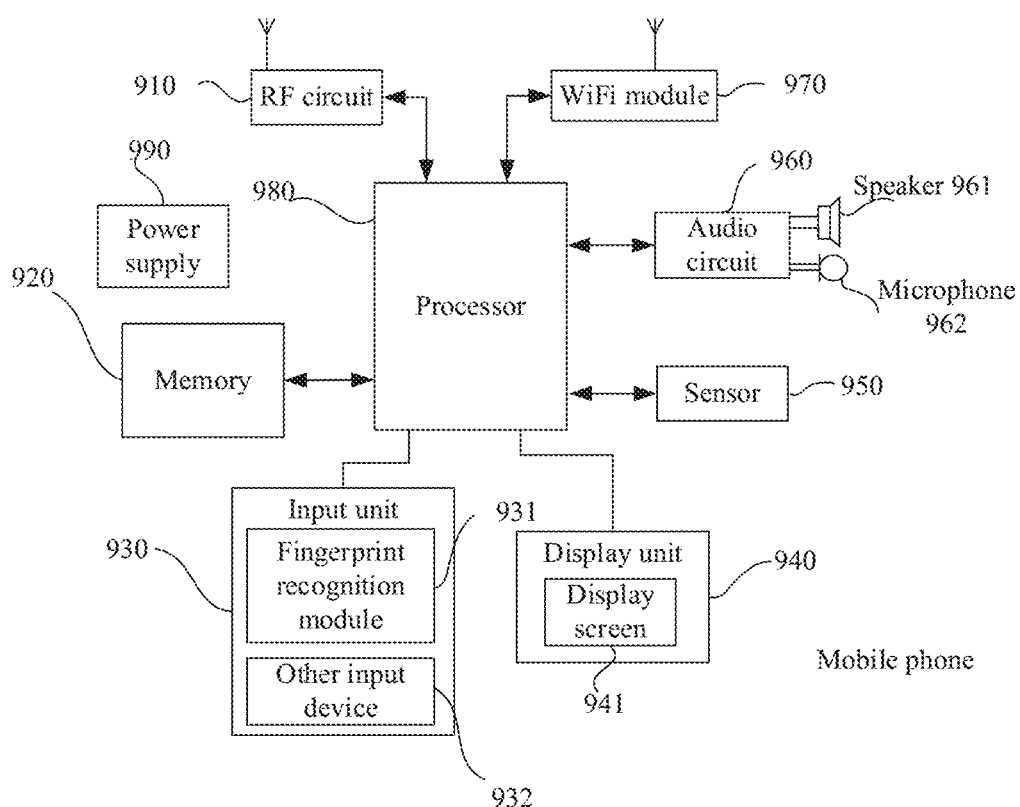
FIG. 8 is a structure diagram of another terminal according to an embodiment of the disclosure.

An embodiment of the disclosure also provides another terminal. As shown in FIG. 8, for convenient description, only parts related to the embodiment of the application are shown, and specific technical details which are undisclosed refer to parts of the method of the embodiments of the disclosure. The terminal may be any terminal device including a mobile phone, a tablet computer, a Personal Digital Assistant (PDA), a Point of Sales (POS), a vehicle-mounted computer and the like. For example, the terminal is a mobile phone.

FIG. 8 is a block diagram of part of a structure of a mobile phone related to a terminal according to an embodiment of the disclosure. Referring to FIG. 8, the mobile phone includes components such as a Radio Frequency (RF) circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone shown in FIG. 8 is not intended to limit the mobile phone and may include components more or fewer than those shown in the figure or some components are combined or different component arrangements are adopted.

Each component of the mobile phone will be specifically introduced below in combination with FIG. 8.

The RF circuit 910 may be configured to receive and send information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with a network and another device through wireless communication. Any communication standard or protocol may be adopted for wireless communication, including, but not limited to, a Global System of Mobile communication (GSM), a General Packet Radio Service (GPRS), Code Division Multiple Access (CDMA), Wideband Code Division Multiple Access (WCDMA), LTE, an electronic mail, Short Messaging Service (SMS) and the like.

The memory 920 may be configured to store a software program and a module. The processor 980 operates the software program and module stored in the memory 920, thereby executing various function applications and data processing of the mobile phone. The memory 920 may mainly include a program storage region and a data storage region. The program storage region may store an operating system, an application program required by at least one function and the like. The data storage region may store data created according to use of the mobile phone and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information and generate key signal input related to user setting and function control of the mobile phone. In an embodiment, the input unit 930 may include a fingerprint recognition module 931 and another input device 932. The fingerprint recognition module 931 may acquire fingerprint data of a user thereon. Besides the fingerprint recognition module 931, the input unit 930 may further include the other input device 932. In an embodiment, the other input device 932 may include, but not limited to, one or more of a touch screen, a physical keyboard, a function key (for example, a volume control button and a switch button), a trackball, a mouse, a stick and the like.

The display unit 940 may be configured to display information input by the user or information provided for the user and various menus of the mobile phone. The display unit 940 may include a display screen 941. Optionally, the display screen 941 may be configured in form of Liquid Crystal Display (LCD) and Organic Light-Emitting Diode (OLED). In FIG. 8, the fingerprint recognition module 931 and the display screen 941 realize input and output functions of the mobile phone as two independent components. However, in some embodiments, the fingerprint recognition module 931 and the display screen 941 may be integrated to realize the input and play functions of the mobile phone.

The mobile phone may further include at least one sensor 950, for example, a light sensor, a motion sensor and another sensor. In an embodiment, the light sensor may include an environmental light sensor and a proximity sensor. The environmental light sensor may regulate brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

The audio circuit 960 includes a speaker 961, and a microphone 962 may provide an audio interface between the user and the mobile phone. The audio circuit 960 may transmit an electric signal obtained by converting received audio data to the speaker 961, and the speaker 961 converts it into a sound signal for playing. On the other hand, the microphone 962 converts a collected sound signal into an electric signal, the audio circuit 960 receives and converts it into audio data, and the audio data is processed by the playing processor 980 and sent to, for example, another mobile phone through the RF circuit 910, or the audio data is played to the memory 920 for further processing.

WiFi is a short-distance wireless transmission technology. The mobile phone may help the user through the WiFi module 970 to receive and send an electronic mail, browse a webpage, access streaming media and the like, and wireless wideband Internet access is provided for the user. Although the WiFi module 970 is shown in FIG. 8, it can be understood that it is not a necessary composition of the mobile phone and may completely be omitted according to a requirement without changing the scope of the essence of the disclosure.

The processor 980 is a control center of the mobile phone, connects each part of the whole mobile phone by use of various interfaces and lines and executes various functions and data processing of the mobile phone by running or executing the software program and/or module stored in the memory 920 and calling data stored in the memory 920, thereby monitoring the whole mobile phone. Optionally, the processor 980 may include one or more processing units. Preferably, the processor 980 may integrate an application processor and a modulation and demodulation processor. The application processor mainly processes the operating system, a user interface, an application program and the like. The modulation and demodulation processor mainly processes wireless communication. It can be understood that the modulation and demodulation processor may also not be integrated into the processor 980.

The mobile phone further includes the power supply 990 supplying power to each part. Preferably, the power supply may be logically connected with the processor 980 through a power management system, thereby realizing functions of charging and discharging management, power consumption management and the like through the power management system.

Although not shown in the figure, the mobile phone may further include a camera, a Bluetooth module and the like, which will not be elaborated herein.

In the embodiment shown in FIG. 2, the flow on a terminal side in each operation of the method may be implemented on the basis of the structure of the mobile phone.

In the embodiments shown in FIG. 4 and FIG. 5, each functional unit may be implemented on the basis of the structure of the mobile phone.

An embodiment of the disclosure also provides a computer-readable storage medium, which stores a computer program configured for electronic data exchange, the computer program enabling a computer to execute part or all of the operations executed by the terminal in, for example, the abovementioned method embodiments.

An embodiment of the disclosure also provides a computer-readable storage medium, which stores a computer program configured for electronic data exchange, the computer program enabling a computer to execute part or all of the operations executed by the network-side device in, for example, the abovementioned method embodiments.

An embodiment of the disclosure also provides a computer program product. The computer program product includes a non-transitory computer-readable storage medium storing a computer program. The computer program may be operated to enable a computer to execute part or all of the operations executed by the terminal in, for example, the abovementioned method embodiments. The computer program product may be a software installation package.

An embodiment of the disclosure also provides a computer program product. The computer program product includes a non-transitory computer-readable storage medium storing a computer program. The computer program may be operated to enable a computer to execute part or all of the operations executed by the network-side device in, for example, the abovementioned methods. The computer program product may be a software installation package.

The operations of the method or algorithm described in the embodiments of the disclosure may be implemented in a hardware manner, and may also be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementations further describe the purposes, technical solutions and beneficial effects of the embodiments of the disclosure in detail. It is to be understood that the above is only the specific implementation of the embodiments of the disclosure and not intended to limit the scope of protection of the embodiments of the disclosure. Any modifications, equivalent replacements, improvements and the like made on the basis of the technical solutions of the embodiments of the disclosure shall fall within the scope of protection of the embodiments of the disclosure.

The invention claimed is:

1. A method for Scheduling Request (SR) transmission control, comprising:

acquiring, by a terminal, reference information, required to be indicated to a network-side device, of a first parameter, the first parameter being a parameter associated with cached data to be transmitted of the terminal, the reference information of the first parameter being a reference information of a resource for transmitting the cached data, the reference information of the resource being used for the network-side device to determine a licensed resource, the licensed resource being used to transmit the cached data, wherein the parameter associated with the cached data to be transmitted of the terminal comprises a Physical (PHY)-layer parameter numerology of the licensed resource used to transmit the cached data;

querying, by the terminal, a preset mapping relationship between information of the first parameter and information of a second parameter of a Physical Uplink Control Channel (PUCCH) resource to acquire reference information, mapping to the reference information of the first parameter, of the second parameter of the PUCCH resource, the second parameter being a parameter associated with the PUCCH resource used to transmit an SR, wherein the preset mapping relationship is pre-configured by the terminal through a high layer of a protocol stack, and wherein the second parameter comprises a resource type of the PUCCH resource and a resource block identifier of the PUCCH resource; and transmitting, by the terminal, the SR used to schedule the cached data, on the PUCCH resource determined by the reference information of the second parameter.

2. The method of claim 1, before acquiring, by the terminal, the reference information of the first parameter required to be indicated to the network-side device, further comprising:
acquiring, by the terminal, the cached data.

3. The method of claim 1, wherein acquiring, by the terminal, the reference information of the first parameter required to be indicated to the network-side device comprises:
responsive to detecting that no Uplink Shared Channel (UL-SCH) resource is obtained to transmit the cached data, acquiring, by the terminal, the reference information of the first parameter required to be indicated to the network-side device.

4. The method of claim 1, wherein the cached data comprises at least one of: data cached in a Radio Link Control (RLC) layer of the terminal or data cached in a Packet Data Convergence Protocol (PDCP) layer of the terminal.

5. The method of claim 1, wherein the parameter associated with the cached data to be transmitted of the terminal comprises a Transmission Time Interval (TTI) duration of the licensed resource used to transmit the cached data or a data size of the cached data; and
the second parameter comprises or a total number of repeated SR transmission times on the PUCCH resource.

6. The method of claim 1, wherein the PUCCH resource comprises at least one of: a short-duration PUCCH resource or a long-duration PUCCH resource.

7. A terminal, comprising a processor and a transceiver, wherein
the transceiver is configured to acquire reference information, required to be indicated to a network-side device, of a first parameter, the first parameter being a parameter associated with cached data to be transmitted of the terminal, the reference information of the first parameter being a reference information of a resource for transmitting the cached data, the reference information of the first parameter being used for the network-side device to determine a licensed resource and the licensed resource being used to transmit the cached data, wherein the parameter associated with the cached data to be transmitted of the terminal comprises a Physical (PHY)-layer parameter numerology of the licensed resource used to transmit the cached data;

the processor is configured to query a preset mapping relationship between information of the first parameter and information of a second parameter of a Physical Uplink Control Channel (PUCCH) resource to acquire reference information, mapping to the reference information of the first parameter, of the second parameter of the PUCCH resource, the second parameter being a parameter associated with the PUCCH resource used to transmit a Scheduling Request (SR), wherein the preset mapping relationship is pre-configured by the terminal through a high layer of a protocol stack, and wherein the second parameter comprises a resource type of the PUCCH resource and a resource block identifier of the PUCCH resource; and the transceiver is configured to transmit, through the communication unit, the SR used to schedule the cached data, on the PUCCH resource determined by the reference information of the second parameter.

8. The terminal of claim 7, wherein the transceiver is further configured to, before acquiring, by the terminal, the reference information of the first parameter required to be indicated to the network-side device, acquire the cached data.

9. The terminal of claim 7, wherein the transceiver is configured to:
responsive to detecting that no Uplink Shared Channel (UL-SCH) resource is obtained to transmit the cached data, acquire the reference information of the first parameter required to be indicated to the network-side device.

10. The terminal of claim 7, wherein the cached data comprises at least one of: data cached in a Radio Link Control (RLC) layer of the terminal or data cached in a Packet Data Convergence Protocol (PDCP) layer of the terminal.

11. The terminal of claim 7, wherein the parameter associated with the cached data to be transmitted of the terminal comprises a Transmission Time Interval (TTI) duration of the licensed resource used to transmit the cached data or a data size of the cached data; and
the second parameter comprises a total number of repeated SR transmission times on the PUCCH resource.

12. The terminal of claim 7, wherein the PUCCH resource comprises at least one of: a short-duration PUCCH resource or a long-duration PUCCH resource.

13. A network-side device, comprising a processor and a transceiver, wherein
the transceiver is configured to receive a Scheduling Request (SR) used to schedule cached data, on a Physical Uplink Control Channel (PUCCH) resource determined by reference information of a second parameter, the second parameter being a parameter associated with the PUCCH resource used to transmit the SR;

the processor is configured to query a preset mapping relationship between information of a first parameter and information of the second parameter of the PUCCH resource to acquire reference information of the first parameter, the first parameter being a parameter associated with the cached data to be transmitted of a terminal, the reference information of the first parameter being a reference information of a resource for transmitting the cached data, wherein the parameter associated with the cached data to be transmitted of the terminal comprises a Physical (PHY)-layer parameter numerology of the licensed resource used to transmit the cached data, wherein the preset mapping relationship is pre-configured by the terminal through a high layer of a protocol stack, and wherein the second parameter comprises a resource type of the PUCCH resource and a resource block identifier of the PUCCH resource; and the transceiver is configured to send a resource scheduling instruction for a licensed resource used to transmit the cached data, the resource scheduling instruction containing indication information of the licensed resource determined by the reference information of the second parameter.

14. The network-side device of claim 13, wherein the transceiver is configured to, after sending, by the network-side device, the resource scheduling instruction for the licensed resource used to transmit the cached data, receive the cached data on the licensed resource determined by the reference information of the second parameter.

15. The network-side device of claim 13, wherein the cached data comprises at least one of: data cached in a Radio Link Control (RLC) layer of the terminal or data cached in a Packet Data Convergence Protocol (PDCP) layer of the terminal.

16. The network-side device of claim 13, wherein the parameter associated with the cached data to be transmitted of the terminal comprises a Transmission Time Interval (TTI) duration of the licensed resource used to transmit the cached data or a data size of the cached data; and the second parameter comprises a total number of repeated SR transmission times on the PUCCH resource.

17. The network-side device of claim 13, wherein the PUCCH resource comprises at least one of: a short-duration PUCCH resource or a long-duration PUCCH resource.

* * * * *